(12) United States Patent
Chapman et al.

(10) Patent No.: US 7,835,274 B2
(45) Date of Patent: Nov. 16, 2010

(54) WIDEBAND PROVISIONING

(75) Inventors: John T. Chapman, Saratoga, CA (US);
Alon Shlomo Bernstein, Sunnyvale, CA (US); Jin Zhang, Sunnyvale, CA (US);
William Guckel, Boxborough, MA (US); Shengyou Zeng, Concord, MA (US)

(73) Assignee: Cisco Technology, Inc., San Jose, CA (US)

(*) Notice: Subject to any disclaimer, the term of this patent is extended or adjusted under 35 U.S.C. 154(b) by 896 days.

(21) Appl. No.: 11/138,220

(22) Filed: May 25, 2005

(65) Prior Publication Data

US 2006/0002294 A1    Jan. 5, 2006

Related U.S. Application Data

(60) Provisional application No. 60/574,506, filed on May 25, 2004, provisional application No. 60/574,876, filed on May 26, 2004, provisional application No. 60/622,312, filed on Oct. 25, 2004, provisional application No. 60/624,490, filed on Nov. 1, 2004, provisional application No. 60/635,995, filed on Dec. 13, 2004, provisional application No. 60/588,635, filed on Jul. 16, 2004, provisional application No. 60/582,732, filed on Jun. 22, 2004, provisional application No. 60/590,509, filed on Jul. 23, 2004.

(51) Int. Cl.
*G01R 31/08* (2006.01)
*H04B 1/44* (2006.01)
*H04L 12/28* (2006.01)

(52) U.S. Cl. .................. 370/229; 370/282; 370/392
(58) Field of Classification Search ................ 370/392
See application file for complete search history.

(56) References Cited

U.S. PATENT DOCUMENTS 4,977,593 A    12/1990    Balance
5,153,763 A    10/1992    Pidgeon (Continued)

FOREIGN PATENT DOCUMENTS

WO          00/72509       11/2000

(Continued)

OTHER PUBLICATIONS

U.S. Appl. No. 11/131,766, filed May 17, 2005, Chapman et al.

(Continued)

*Primary Examiner*—Daniel J Ryman
*Assistant Examiner*—John Blanton
(74) *Attorney, Agent, or Firm*—Stolowitz Ford Cowger LLP

(57) ABSTRACT

A provisioning server has a port to receive a request for a network address including an indication that a remote device is wideband capable. The provisioning server also has a processor to respond to the request with a network address and include an address for a configuration file and to provide a configuration file that allows wideband service. A cable modem has a port to request a network address and indicate wideband capability. The cable modem also has a processor to receive a response to that request that includes a network address and an address for a configuration file. The processor also receives a configuration file and allows the cable modem to be configured for wideband service.

20 Claims, 13 Drawing Sheets

U.S. PATENT DOCUMENTS

| | | | |
|---|---|---|---|
| 5,457,678 A | 10/1995 | Goeldner | |
| 5,604,735 A | 2/1997 | Levinson et al. | |
| 5,724,510 A | 3/1998 | Arndt et al. | |
| 5,784,597 A | 7/1998 | Chiu et al. | |
| 5,805,602 A | 9/1998 | Cloutier et al. | |
| 5,918,019 A | 6/1999 | Valencia | |
| 5,931,954 A | 8/1999 | Hoshina et al. | |
| 5,933,420 A | 8/1999 | Jaszewski et al. | |
| 5,963,557 A | 10/1999 | Eng | |
| 6,023,769 A | 2/2000 | Gonzalez | |
| 6,078,595 A | 6/2000 | Jones et al. | |
| 6,101,180 A | 8/2000 | Donahue et al. | |
| 6,137,793 A | 10/2000 | Gorman et al. | |
| 6,233,235 B1 | 5/2001 | Burke et al. | |
| 6,233,246 B1 | 5/2001 | Hareski et al. | |
| 6,275,990 B1 | 8/2001 | Dapper et al. | |
| 6,331,987 B1 | 12/2001 | Beser | |
| 6,381,214 B1 | 4/2002 | Prasad | |
| 6,418,324 B1 | 7/2002 | Doviak et al. | |
| 6,434,141 B1 | 8/2002 | Oz et al. | |
| 6,438,123 B1 | 8/2002 | Chapman | |
| 6,490,727 B1 | 12/2002 | Nazarathy et al. | |
| 6,510,162 B1 | 1/2003 | Fijolek et al. | |
| 6,516,345 B1 | 2/2003 | Kracht | |
| 6,546,017 B1 | 4/2003 | Khaunte | |
| 6,556,591 B2 | 4/2003 | Bernath et al. | |
| 6,640,248 B1 | 10/2003 | Jorgensen | |
| 6,693,878 B1 | 2/2004 | Daruwalla et al. | |
| 6,697,970 B1 | 2/2004 | Chisholm | |
| 6,698,022 B1 | 2/2004 | Wu | |
| 6,751,230 B1 | 6/2004 | Vogel et al. | |
| 6,763,019 B2 | 7/2004 | Mehta et al. | |
| 6,763,032 B1 | 7/2004 | Rabenko et al. | |
| 6,771,606 B1 | 8/2004 | Kuan | |
| 6,804,251 B1 | 10/2004 | Limb et al. | |
| 6,807,193 B1 | 10/2004 | Beser | |
| 6,819,682 B1 | 11/2004 | Rabenko et al. | |
| 6,829,250 B2 | 12/2004 | Voit et al. | |
| 6,847,635 B1 | 1/2005 | Beser | |
| 6,853,680 B1 | 2/2005 | Nikolich | |
| 6,857,132 B1 | 2/2005 | Rakib et al. | |
| 6,901,079 B1 | 5/2005 | Phadnis et al. | |
| 6,930,988 B2 | 8/2005 | Koodli et al. | |
| 6,950,399 B1 | 9/2005 | Bushmitch et al. | |
| 6,959,042 B1 | 10/2005 | Liu et al. | |
| 6,986,157 B1 * | 1/2006 | Fijolek et al. | 725/111 |
| 6,993,016 B1 | 1/2006 | Liva et al. | |
| 6,993,353 B2 | 1/2006 | Desai et al. | |
| 6,996,129 B2 | 2/2006 | Krause et al. | |
| 7,006,500 B1 | 2/2006 | Pedersen et al. | |
| 7,007,296 B2 | 2/2006 | Rakib et al. | |
| 7,023,871 B2 | 4/2006 | Lind et al. | |
| 7,023,882 B2 | 4/2006 | Woodward, Jr. et al. | |
| 7,039,049 B1 | 5/2006 | Akgun et al. | |
| 7,050,419 B2 | 5/2006 | Azenkot et al. | |
| 7,065,779 B1 | 6/2006 | Crocker et al. | |
| 7,067,734 B2 | 6/2006 | Abe et al. | |
| 7,110,398 B2 | 9/2006 | Grand et al. | |
| 7,113,484 B1 | 9/2006 | Chapman et al. | |
| 7,116,643 B2 | 10/2006 | Huang et al. | |
| 7,117,526 B1 | 10/2006 | Short | |
| 7,139,923 B1 | 11/2006 | Chapman et al. | |
| 7,145,887 B1 | 12/2006 | Akgun | |
| 7,149,223 B2 | 12/2006 | Liva et al. | |
| 7,161,945 B1 | 1/2007 | Cummings | |
| 7,164,690 B2 | 1/2007 | Limb et al. | |
| 7,197,052 B1 | 3/2007 | Crocker | |
| 7,206,321 B1 | 4/2007 | Bansal et al. | |
| 7,209,442 B1 | 4/2007 | Chapman | |
| 7,269,159 B1 | 9/2007 | Lai | |
| 7,290,046 B1 | 10/2007 | Kumar | |
| 7,359,332 B2 | 4/2008 | Kolze et al. | |
| 7,363,629 B2 | 4/2008 | Springer et al. | |
| 7,490,345 B2 | 2/2009 | Rakib et al. | |
| 7,492,763 B1 | 2/2009 | Alexander, Jr. | |
| 7,548,558 B2 | 6/2009 | Rakib et al. | |
| 2001/0010096 A1 | 7/2001 | Horton et al. | |
| 2001/0055319 A1 | 12/2001 | Quigley et al. | |
| 2001/0055469 A1 | 12/2001 | Shida et al. | |
| 2002/0009974 A1 | 1/2002 | Kuwahara et al. | |
| 2002/0010750 A1 | 1/2002 | Baretzki | |
| 2002/0023174 A1 * | 2/2002 | Garrett et al. | 709/245 |
| 2002/0052927 A1 * | 5/2002 | Park | 709/217 |
| 2002/0062450 A1 | 5/2002 | Carlson et al. | |
| 2002/0067721 A1 | 6/2002 | Kye | |
| 2002/0073432 A1 | 6/2002 | Kolze | |
| 2002/0073433 A1 | 6/2002 | Furuta et al. | |
| 2002/0088003 A1 | 7/2002 | Salee | |
| 2002/0093935 A1 | 7/2002 | Denney et al. | |
| 2002/0093955 A1 | 7/2002 | Grand et al. | |
| 2002/0131403 A1 | 9/2002 | Desai et al. | |
| 2002/0131426 A1 | 9/2002 | Amit et al. | |
| 2002/0133618 A1 | 9/2002 | Desai et al. | |
| 2002/0136203 A1 | 9/2002 | Liva et al. | |
| 2002/0141585 A1 | 10/2002 | Carr | |
| 2002/0144284 A1 * | 10/2002 | Burroughs et al. | 725/111 |
| 2002/0146010 A1 | 10/2002 | Shenoi et al. | |
| 2002/0147978 A1 | 10/2002 | Dolgonos et al. | |
| 2002/0154655 A1 | 10/2002 | Gummalla et al. | |
| 2002/0161924 A1 | 10/2002 | Perrin et al. | |
| 2002/0198967 A1 | 12/2002 | Iwanojko et al. | |
| 2003/0014762 A1 | 1/2003 | Conover et al. | |
| 2003/0026230 A1 | 2/2003 | Ibanez et al. | |
| 2003/0043802 A1 | 3/2003 | Yazaki et al. | |
| 2003/0058794 A1 | 3/2003 | Pantelias et al. | |
| 2003/0061415 A1 | 3/2003 | Horton et al. | |
| 2003/0066087 A1 | 4/2003 | Sawyer et al. | |
| 2003/0067944 A1 | 4/2003 | Sala et al. | |
| 2003/0101463 A1 | 5/2003 | Greene et al. | |
| 2003/0140131 A1 | 7/2003 | Chandrashekhar et al. | |
| 2003/0163341 A1 * | 8/2003 | Banerjee et al. | 705/1 |
| 2003/0214943 A1 | 11/2003 | Engstrom et al. | |
| 2003/0214982 A1 | 11/2003 | Lorek et al. | |
| 2004/0039466 A1 | 2/2004 | Lilly et al. | |
| 2004/0045037 A1 | 3/2004 | Cummings et al. | |
| 2004/0071148 A1 | 4/2004 | Ozaki et al. | |
| 2004/0073902 A1 | 4/2004 | Kao et al. | |
| 2004/0101077 A1 | 5/2004 | Miller et al. | |
| 2004/0105403 A1 | 6/2004 | Lin et al. | |
| 2004/0105406 A1 | 6/2004 | Kayama et al. | |
| 2004/0143593 A1 | 7/2004 | Le Maut et al. | |
| 2004/0160945 A1 | 8/2004 | Dong et al. | |
| 2004/0163129 A1 | 8/2004 | Chapman et al. | |
| 2004/0181800 A1 | 9/2004 | Rakib et al. | |
| 2004/0244043 A1 * | 12/2004 | Lind et al. | 725/111 |
| 2004/0248530 A1 | 12/2004 | Rakib et al. | |
| 2005/0010958 A1 | 1/2005 | Rakib et al. | |
| 2005/0018697 A1 | 1/2005 | Enns et al. | |
| 2005/0122976 A1 | 6/2005 | Poli et al. | |
| 2005/0138669 A1 | 6/2005 | Baran | |
| 2005/0198684 A1 | 9/2005 | Stone et al. | |
| 2005/0201399 A1 | 9/2005 | Woodward, Jr. et al. | |
| 2005/0220126 A1 | 10/2005 | Gervais et al. | |
| 2005/0226257 A1 | 10/2005 | Mirzabegian et al. | |
| 2005/0232294 A1 | 10/2005 | Quigley et al. | |
| 2005/0259645 A1 | 11/2005 | Chen et al. | |
| 2005/0265261 A1 | 12/2005 | Droms et al. | |
| 2005/0265309 A1 | 12/2005 | Parandekar | |
| 2005/0265338 A1 | 12/2005 | Chapman et al. | |
| 2005/0265376 A1 | 12/2005 | Chapman et al. | |
| 2005/0265392 A1 | 12/2005 | Chapman et al. | |
| 2005/0265394 A1 | 12/2005 | Chapman et al. | |
| 2005/0265397 A1 | 12/2005 | Chapman et al. | |
| 2005/0265398 A1 | 12/2005 | Chapman et al. | |

| | | |
|---|---|---|
| 2005/0289623 A1 | 12/2005 | Midani et al. |
| 2006/0002294 A1 | 1/2006 | Chapman et al. |
| 2006/0098669 A1 | 5/2006 | Enns et al. |
| 2006/0126660 A1 | 6/2006 | Denney et al. |
| 2006/0159100 A1 | 7/2006 | Droms et al. |
| 2006/0168612 A1 | 7/2006 | Chapman et al. |
| 2007/0274345 A1 | 11/2007 | Taylor et al. |
| 2008/0037545 A1 | 2/2008 | Lansing et al. |

FOREIGN PATENT DOCUMENTS

| | | |
|---|---|---|
| WO | 0072509 | 11/2000 |
| WO | 2005117310 | 12/2005 |
| WO | 2005117358 | 12/2005 |

OTHER PUBLICATIONS

U.S. Appl. No. 11/135,777, filed May 23, 2005, Chapman et al.
U.S. Appl. No. 11/137,606, filed May 24, 2005, Chapman et al.
Ramakrishnan, Sangeeta, "Next Generation Edge—Realizing the vision of shared resources and bandwidth", date unknown, 16 pgs.
Cisco Systems, Inc., "Downstream External PHY Interface Specification", SP-DEPI-W2-041101A.DOC, EDCS-408926, date unknown.
Chapman, John T., "Remote PHY Technical White Paper Addendum," Downstream External PHY Interface Specification, Cisco Systems, Inc., EDCS-377253, date unknown.
Chapman, John T., "CMTS Remote PHY for a DOCSIS Network: DMPI Over IP Protocol Specification", RP-SP-DoIP-D1-040715B. doc, Cisco Systems, Inc., EDCS-387722, date unknown.
Postel, J., "User Datagram Protocol", RFC 768, Aug. 28, 1980, 3 pgs.
Postel, Jon, Editor, "DARPA Internet Program Protocol Specification", RFC 791, Sep. 1981, 45 pages.
Deering, S., "Host Extensions for IP Multicasting", RFC 1112, Aug. 1989.
Droms, R., "Dynamic Host Configuration Protocol", RFC 2131, Mar. 1997.
Townsley, W., et al., "Layer Two Tunneling Protocol "L2TP"", RFC 2661, Aug. 1999, 80 pages.
Cable Television Laboratories, Inc., "Data-Over-Cable Service Interface Specifications DOCSIS 2.0, Radio Frequency Specification", SP-RFIv2.0-I04-030730, 1999-2003, 488 pages.
Cable Television Laboratories, Inc., "Data-Over-Cable Service Interface Specification DOCSIS 2.0, Radio Frequency Interface Specification", CM-SP-RFIv2.0-I08-050408, Annex C, pp. 339-390, Copyright 1999-2005.
Cable Television Laboratories, Inc., "Data-Over-Cable Service Interface Specifications DOCSIS 2.0, Radio Frequency Specification", CM-SP-RFIv2.0-I09-050812, 1999-2005, 534 pages.
Cable Television Laboratories, Inc., "DOCSIS® Set-top Gateway (DSG) Interface Specification" CM-SP-DSG-I02-040804, Copyright 2001-2004.
Cable Television Laboratories, Inc., "DOCSIS® Set-top Gateway (DSG) Interface Specification" CM-SP-DSG-I04-050408, Copyright 2001-2005.
Bhattacharyya, et al., "An Overview of Source-Specific Multicast (SSM)", RFC 3569, Jul. 2003.
Droms, R., et al., "Dynamic Host Configuration Protocol for IPv6 (DHCPv6)", RFC 3315, Jul. 2003.
Droms, R., "Stateless Dynamic Host Configuration Protocol (DHCP) Service for IPv6", RFC 3736, Apr. 2004.
Cisco Systems, Inc., DHCP and the DOCSIS Configuration File for Cable Modems (DOCSIS 1.0), Document ID: 10961, Sep. 16, 2004.
IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.
Cable Television Laboratories, Inc., "Data-Over-Cable Service Interface Specifications Modular CMTS", CM-SP-DEPI-W03-050302, 49 pgs., Copyright 2005.
Lau, J., et al., "Layer Two Tunneling Protocol—Version 3 (L2TPv3)," RFC 3931, Mar. 2005, 94 pages.
M. Patrick; RFC3046—DHCP Relay Agent Information Option; The Internet Society (2001) http://www.faqs.org/rfcs/rfc3046.html; Jan. 2001; 11 Pages.

Thompson, et al. IPv6 Stateless Address Autoconfiguration, RFC 2462, Dec. 1998, pp. 1-24, Network Working Group.
Thompson, et al. IPv6 Stateless Address Autoconfiguration, RFC 4862, Sep. 2007, pp. 1-29, Network Working Group.
Hawa et al., "Quality of Service Scheduling in Cable and Broadband Wireless Access Systems," at http://www.ittc.ku.edu/publications/documents/Hawa2002_iwqos_paper.pdf, downloaded on Sep. 29, 2008.
Fellows et al., "DOCSIS Cable Modem Technology", IEEE Communication Magazine, vol. 39, Issue 3, Mar. 2001, pp. 202-209.
Townsley, W., et al., "Layer Two Tunneling Protocol "L2TP"", RFC 2661, Aug. 1999, 80 pages.
Droms, R., et al., "Dynamic Host Configuration Protocol for IPv6 (DHCPv6)", RFC 3315, Jul. 2003.
Droms, R., "Stateless Dynamic Host Configuration Protocol (DHCP) Service for IPv6", RFC 3736, Apr. 2004.
Cisco Systems, Inc., DHCP and the DOCSIS Configuration File for Cable Modems (DOCSIS 1.0), Document ID: 10961, Sep. 16, 2004.
IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.
Cable Television Laboratories, Inc., "Data-Over-Cable Service Interface Specifications Modular CMTS", CM-SP-DEPI-W03-050302, 49 pgs., Copyright 2005.
Lau, J., et al., "Layer Two Tunneling Protocol—Version 3 (L2TPv3)," RFC 3931, Mar. 2005, 94 pages.
Adoba, et al. Extensible Authentication Protocol (EAP), RFC 3748, Jun. 2004, pp. 1-64, Standards Track.
ITU-T Telecommunications Standardization Sector of ITU, Series J: Cable Networks And Transmission of Television, Sound Programme and other Multimedia Signals, Interactive Systems for Digital Television Distribution, Recommendation J. 122, Dec. 2002, 506 pages, International Telecommunications Union.
Cable Television Laboratories, Inc., "DOCSIS Radio Frequency Interfaces Specification", CM-SP-RFIv2.0-I10-051209, 538 pgs., Dec. 9, 2005.
Madvinsky, et al., Don't Let Your Modem Be Cloned, Jun. 2000, pp. 1-7, Communications Technology.
Millet, Theft of Service-Inevitable?, Dec. 2005, pp. 1-4, Communications Technology.
ETSI, Data-Over-Cable Systems Part 2 Radio Frequency Interface Specifications, Jan. 2003, pp. 59-66, ES 201 488-2 V1.2.1.
Desai, et al., FastChannel: A Higher-Speed Cable Data Service, AT&T Labs-Research, pp. 1-13.
Data Over Cable Service Interface Specification, Aug. 4, 1997.
Ethereal: Display Filter Reference: DOCSIS Upstream Channel Descriptor, Webarchivedate Apr. 27, 2004.
DOCSIS Set Top Gateway (DSG) interface specification, Feb 28, 2002.
An Overview of Internet Protocols, Dann, Jan. 1998.
Patrick, M.; RFC3046-DHCP Rely Agent Information Option; The Internet Society (2001) http://www.faqs.org/rfcs/rfc3046.html; Jan. 2001; 11 pages.
Cable Television Laboratories, Inc., Interim Specification, Data-Over-Cable Service Interface Specifications, Radio Frequency Specification, SP-RFIv1.1-I02-990731, Jul. 30, 1999, 353 pages.
Cable Television Laboratories, Inc., Interim Specification, Data-Over-Cable Service Interface Specifications, Radio Frequency Interface Specification, SP-RFIv1.1-I04-000407, Apr. 7, 2000, 376 pages.
3COM, High-Speed Cable Internet Solutions, http://www.3com.com/cablenow/pdf/7125dsht.pdf, Dec. 1999, 4 pages.
Phuc H. Tran, USPTO Office Action Paper No. 20080427, May 1, 2008, 10 pages.
U.S. Appl. No. 11/292,725, Bernstein et al., "Advanced Multicast Support for Cable", filed Dec. 1, 2005.
Postel, J., "User Datagram Protocol", RFC 768, Aug. 28, 1980, 3 pgs.
Postel, Jon, Editor, "DARPA Internet Program Protocol Specification", RFC 791, Sep. 1981, 45 pages.
Deering, S., "Host Extensions for IP Multicasting", RFC 1112, Aug. 1989.
Droms, R., "Dynamic Host Configuration Protocol", RFC 2131, Mar. 1997.

Townsley, W., et al., "Layer Two Tunneling Protocol "L2TP"", RFC 2661, Aug. 1999, 80 pages.

Cable Television Laboratories, Inc., "Data-Over-Cable Service Interface Specifications DOCSIS 2.0, Radio Frequency Specification", SP-RFIv2.0-I04-030730, 1999-2003, 512 pages.

Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.

Cable Television Laboratories, Inc., "Data-Over-Cable Service Interface Specifications DOCSIS 2.0, Radio Frequency Specification", CM-SP-RFIv2.0-I09-050812, 1999-2005, 534 pages.

Cable Television Laboratories, Inc., "DOCSIS® Set-top Gateway (DSG) Interface Specification" CM-SP-DSG-I02-040804, Copyright 2001-2004.

Cable Television Laboratories, Inc., "DOCSIS® Set-top Gateway (DSG) Interface Specification" CM-SP-DSG-I04-050408, Copyright 2001-2005.

Bhattacharyya, et al., "An Overview of Source-Specific Multicast (SSM)", RFC 3569, Jul. 2003.

Droms, R., et al., "Dynamic Host Configuration Protocol for IPv6 (DHCPv6)", RFC 3315, Jul. 2003.

Droms, R., "Stateless Dynamic Host Configuration Protocol (DHCP) Service for IPv6", RFC 3736, Apr. 2004.

Chapman, John T., "CMTS Remote PHY for a DOCSIS Network: DMPI Over IP Protocol Specification", RP-SP-DoIP-D1-040715B. doc, Cisco Systems, Inc., EDCS-387722, May 26, 2004.

Cisco Systems, Inc., DHCP and the DOCSIS Configuration File for Cable Modems (DOCSIS 1.0), Document ID: 10961, Sep. 16, 2004.

IEEE Standards, "802.16, IEEE Standard for Local and Metropolitan Area Networks, Part 16: Air Interface for Fixed Broadband Wireless Access Systems", IEEE Std. 802.16—2004, October 1, 2004, 893 pages.

Cable Television Laboratories, Inc., "Data-Over-Cable Service Interface Specifications Modular CMTS", CM-SP-DEPI-W03-050302, 49 pgs., Copyright 2005.

Ramakrishnan, Sangeeta, "Next Generation Edge—Realizing the vision of shared resources and bandwidth", SCTE Conference on Emerging Technologies, Jan. 11-13, 2005, 16 pgs.

Chapman, John T., "Remote PHY Technical White Paper Addendum," Downstream External PHY Interface Specification, Cisco Systems, Inc., EDCS-377253, Jan. 24, 2005.

Cisco Systems, Inc., "Downstream External PHY Interface Specification", SP-DEPI-W2-041101A.DOC, EDCS-408926, Jan. 25, 2005.

Lau, J., et al., "Layer Two Tunneling Protocol—Version 3 (L2TPv3)," RFC 3931, Mar. 2005, 94 pages.

Cable Television Laboratories, Inc., "DOCSIS Radio Frequency Interface Specification", CM-SP-RFIv2.0-I10-051209, 538 pgs., Dec. 9, 2005.

Madvinsky, et al., Don't Let Your Modem Be Cloned, Jun. 2000, pp. 1-7, Communications Technology.

Millet, Theft of Service-Inevitable?, Dec. 2005, pp. 1-4, Communications Technology.

ETSI, Data-Over-Cable Systems Part 2 Radio Frequency Interface Specifications, Jan. 2003, pp. 59-66, ES 201 488-2 V1.2.1.

Desai, et al., FastChannel: A Higher-Speed Cable Data Service, AT&T Labs-Research, pp. 1-13.

Adoba, et al., Extensible Authentication Protocol (EAP), RFC 3748, Jun. 2004, pp. 1-64, Standards Track.

ITU-T Telecommunication Standardization Sector of ITU, Series J: Cable Networks And Transmission Of Television, Sound Programme And Other Multimedia Signals, Interactive Systems For Digital Television Distribution, Recommendation J.122, Dec. 2002, 506 pages, International Telecommunication Union.

* cited by examiner

| Type | Length | Value |
|---|---|---|

*Aggregate Qos Mapping*
[X]            n

*Flow List*
[X].1     n          SFREF$_1$, SFREF$_2$... SFREF$_N$

*Aggregated Flow*
[X].2     4          SFREF

*Upstream Channel Configuration Group*
5         n

FIG. 8

| Type Value | Version | Message Name | Message Descritpion |
|---|---|---|---|
| 31 | 4 | WDCD | Wideband Downstream Channel Descriptor |
| 32 | 4 | WUCD | Wideband Upstream Channel Descriptor |

FIG. 9

| Type | Length | Value |
| --- | --- | --- |

*Bonded Downstream Channel ID Config. Setting*
44        2         Channel ID

*Enable WB Mode Configuration*
45        1         1 or 0

*RF Channel Frequency*
1         4         Rx Frequency

*RF Channel Modulation Type*
2         1         0 = 64 QAM
                    1 = 256 QAM
                    2-225: Reserved

*RF Channel PID*
3         2         PID Value

*RF Channel Annex Type*
4         1         0 = Annex A
                    1 = Annex B
                    2-225: Reserved

FIG. 10

WIDEBAND PROVISIONING

RELATED APPLICATIONS

This application claims priority of U.S. provisional patent application No. 60/574,506, filed May 25, 2004, and U.S. provisional patent application No. 60/574,876, filed May 26, 2004, and U.S. provisional patent application No. 60/622,312, filed Oct. 25, 2004, and U.S. provisional patent application No. 60/624,490, filed Nov. 1, 2004, and U.S. provisional patent application No. 60/635,995, filed Dec. 13, 2004, and U.S. provisional patent application No. 60/588,635, filed Jul. 16, 2004, U.S. provisional patent application No. 60/582,732, filed Jun. 22, 2004, and U.S. provisional patent application No. 60/590,509, filed Jul. 23, 2004.

BACKGROUND OF THE INVENTION

The Internet has changed society and is as much a part of modern culture as television and telephones. People are becoming increasingly connected to share and access information. This interconnectivity promotes improvements in the computing and communication infrastructure.

Much of this infrastructure was designed for entertainment or communication, but is being adapted to deliver general data. The addition of general information and data transmission over the legacy infrastructure has necessarily been somewhat restrained by the need for the infrastructure to continue its initial functions. Furthermore, legacy technical characteristics of this infrastructure influence the various solutions to include information storage and transmission. Most major entertainment and communication channels now include computer networking capabilities.

Many people get their television service through cable television (CATV). CATV was initially developed to deliver television signals to areas where antennas had difficulty picking up television broadcasts. Coaxial cabling is the primary type of cabling used by the cable television industry because it is much less susceptible to interference and can carry large amounts of data.

Television signals are broadcast in 6 MHz channels and this channel bandwidth was incorporated into cable television. As transmission demands increased, parts of the coaxial backbone were replaced with optical fiber to create a hybrid fiber-coaxial (HFC) network. The bandwidth of the cable infrastructure makes it an attractive technology to incorporate data transmission.

An example use of data over a cable television network was approved by the International Telecommunications Union (ITU) which includes interface requirements for high speed data communication, and is called the data over cable service interface specification (DOCSIS). Cable service providers also offer internet service through the cable television network in 6 MHz channels for downstream data. Upstream data has historically received less bandwidth and has been offered in a fraction of a channel, such as in 2 MHz provisions. This asymmetry was due to the Internet initially being an information provider. Currently, peer-to-peer computing, file sharing, gaming, and other uses have increased the need for upstream bandwidth.

Due to the legacy CATV infrastructure primarily being a broadcast channel, there are different modulation schemes for upstream and downstream transmission, for example, downstream utilize 64 and 256 Quadrature Amplitude Modulation (QAM) and upstream utilizes Quadrature Phase Shift Keying or 16 QAM. Furthermore, to allow maximum data transmission through different networks, DOCSIS supports use of various combinations of modulation and therefore different data rates, which in turn complicates the physical layer in these networks.

Placing upstream and downstream data onto the cable television network requires special equipment at each end of the HFC plant. On the customer end, a cable modulator/demodulator (cable modem, or CM) transmits and receives data over the cable television infrastructure and on the cable provider end a cable modem termination system (CMTS) is used to place and retrieve data from the cable television network.

Typically a CMTS broadcasts to numerous CMs over a shared channel while each CM separately sends upstream data. In this framework, a cable modem must select only the broadcast downstream data that is intended for it while it must follow an arbitration protocol to avoid data collisions with other cable modems while transmitting upstream data. Cable modems are identified by Service Identifiers (SIDs). SIDs are used as a BPI (baseline privacy) index on the downstream (DS) and also to designate upstream data to certain CMs for the CMTS on the upstream (US).

The upstream bandwidth is allocated by a CMTS and is shared among multiple CMs. Upstream transmissions are divided into mini-slots which may carry up to 1024 bytes, but in practice often contain considerably less bytes to conserve bandwidth. The arbitration protocol for upstream transmissions is assigned by a CMTS in response to requests by CMs. The CMTS communicates these assignments to each cable modem with a media access control (MAC) packet called a mini-slot allocation packet (MAP).

What is needed is a method and apparatus to satisfy the requirements of peer-to-peer computing, file sharing, distributed computing, gaming, and other applications which have an increased need for upstream bandwidth. A wideband cable system may be employed to improve downstream or upstream cable service, and further to provision and configure a wideband cable functionality.

SUMMARY OF THE INVENTION

One embodiment is a provisioning server having a port to receive a request for a network address including an indication that a remote device is wideband capable. The provisioning server also has a processor to respond to the request with a network address and include an address for a configuration file and to provide a configuration file that allows wideband service. Another embodiment is a cable modem having a port to request a network address and indicate wideband capability. The cable modem also has a processor to receive a response to that request that includes a network address and an address for a configuration file. The processor also receives a configuration file and allows the cable modem to be configured for wideband service.

BRIEF DESCRIPTION OF THE DRAWINGS

Embodiments of the invention may be best understood by reading the disclosure with reference to the drawings, wherein:

FIG. 8 illustrates example TLVs for upstream configuration.

FIG. 9 illustrates additional MAC management message types that may be used in wideband provisioning.

FIG. 10 illustrates example TLVs for downstream configuration.

DETAILED DESCRIPTION

In the following description, numerous specific details are set forth. However, it is understood that embodiments of the inventions may be practiced without these specific details. In other instances, well-known circuits, structures, and techniques have not been shown in detail in order to not obscure the understanding of this description.

Reference in the specification to "one embodiment" or "an embodiment", etc., means that a particular feature, structure, or characteristic described in connection with the embodiment is included in at least one aspect of the invention. The appearances of the phrase "in one embodiment" in various places in the specification do not necessarily all refer to the same embodiment.

Generally, a wideband protocol may be developed for cable communication. To enable a wideband protocol, different devices in a cable network must be configurable to provide wideband service. For example, this configuration may occur at the same time as conventional cable modem registration or may occur separately. In an embodiment a provisioning server contains a configuration file that is used to provision service to a cable modem and the service may be negotiated during a registration between the cable modem and provisioning server. In some embodiments a configuration file may be changed with dynamic service messages.

Due to the different architectures for upstream and downstream transmissions in a cable network and cable devices, different methods may be used to provide wideband functionality. For downstream communications to a cable modem, narrowband channels may be bonded together to form a wideband channel. For upstream communications from a cable modem, identifiers may be placed into discrete portions of a data flow, and can therefore distribute the data in a streaming fashion over one or multiple channels. Incorporated herein by reference are the following U.S. patent applications: UPSTREAM PHYSICAL INTERFACE FOR MODULAR CABLE MODEM TERMINATION SYSTEM, application Ser. No. 11/131,766, filed May 17, 2005, WIDEBAND DOWNSTREAM PROTOCOL, application Ser. No. 11/137, 606, filed May 24, 2005, and WIDEBAND UPSTREAM PROTOCOL application Ser. No. 11/135,777, filed May 23, 2005.

To ensure reverse compatibility and a more robust design, a wideband architecture includes narrowband functionality. The ability for any wideband component or protocol to function in a narrowband manner allows redundant use of configuration information, as stated above, this information may be obtained separately or at the same time.

Figure 1:
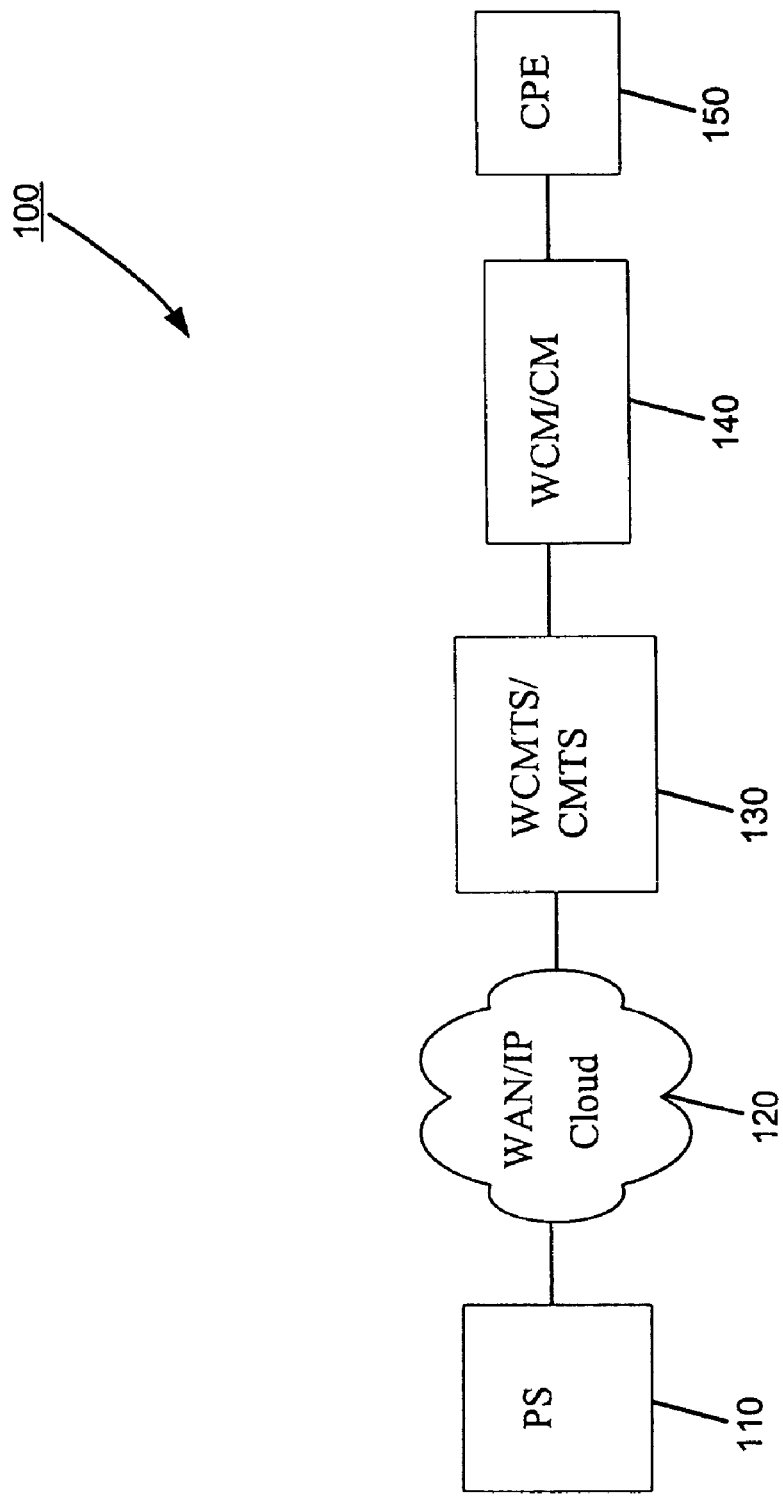
FIG. 1 illustrates a cable network that may provide a wideband cable service.

FIG. 1 illustrates a cable network 100 that may provide a wideband cable service. Provisioning server 110 couples with a wideband capable CMTS 130 through a packet switched network such as WAN/IP Cloud 120. In an embodiment the provisioning server and CMTS may reside in the same device. In some embodiments, the CMTS 130 comprises both wideband CMTS (WCMTS) and conventional CMTS functionality. In other embodiments the WCMTS and CMTS may be in separate devices. Cable network 100 also includes a CM 140 that may comprise a wideband CM (WCM). The CM and the WCM may be in a single device or in different devices. CM 140 is typically coupled with CMTS 130 through a HFC plant, but may also be coupled by a simple coaxial connection or any other connection. Consumer premises equipment (CPE), such as a personal computer or other device capable of coupling with a CM 140, is coupled with CM 140 and may receive or send data, video, audio, or other information, over the cable network 100.

Figure 2:
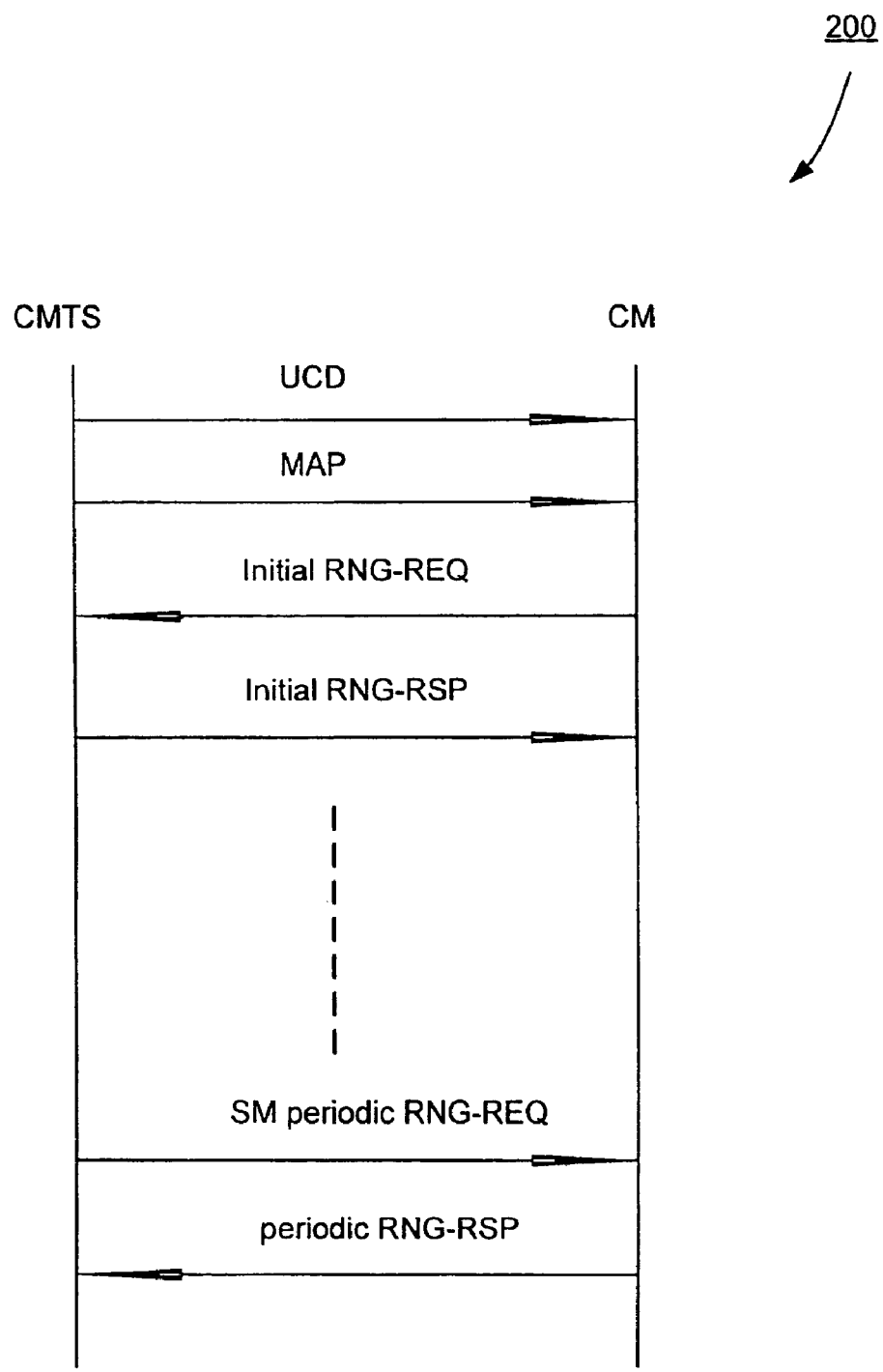
FIG. 2 illustrates a wideband modem registration.

FIG. 2 represents a portion of a modem registration. Some embodiments may use a double registration where they register narrowband and wideband separately, and other embodiments may use a single registration where both are done in one registration procedure.

In FIG. 2, a CMTS may send upstream channel descriptors (UCDs) to define the characteristics of an embodiment upstream channel. A CM may pick a UCD, for example UCD 1, and then receive MAP messages, which allocate the upstream physical layer (PHY). Once map messages are received, a CM may send an initial maintenance message such as a range request (RNG-REQ) and the CMTS may reply with a range response (RNG-RSP). So far this illustrates a DOCSIS registration. Conventionally at this stage, there would be a trivial file transfer protocol exchange (TFTP), a dynamic host configuration protocol (DHCP) exchange to dynamically assign an IP address, a time of day (TOD) exchange, and perhaps other conventional exchanges. In an embodiment a cable modem may go directly into station maintenance.

Referring to FIG. 2, there is a station maintenance periodic RNG-REQ, a periodic RNG-RSP, and a keep-alive function (not shown). In one embodiment TFTP, DHCP, time of day, etc., may be skipped when all the information needed to register a modem is already gathered. For example, a cable modem will not need to register each one of a plurality of upstreams and have a different set of TFTP and DHCP's per upstream if it already has all the relevant information from another registration.

A double registration modem may have a narrowband registration and a wideband registration. Therefore a wideband registration file may already contain all the information needed to bring multiple downstreams online as well as all the information needed for a service flow for the upstream.

Figure 3:
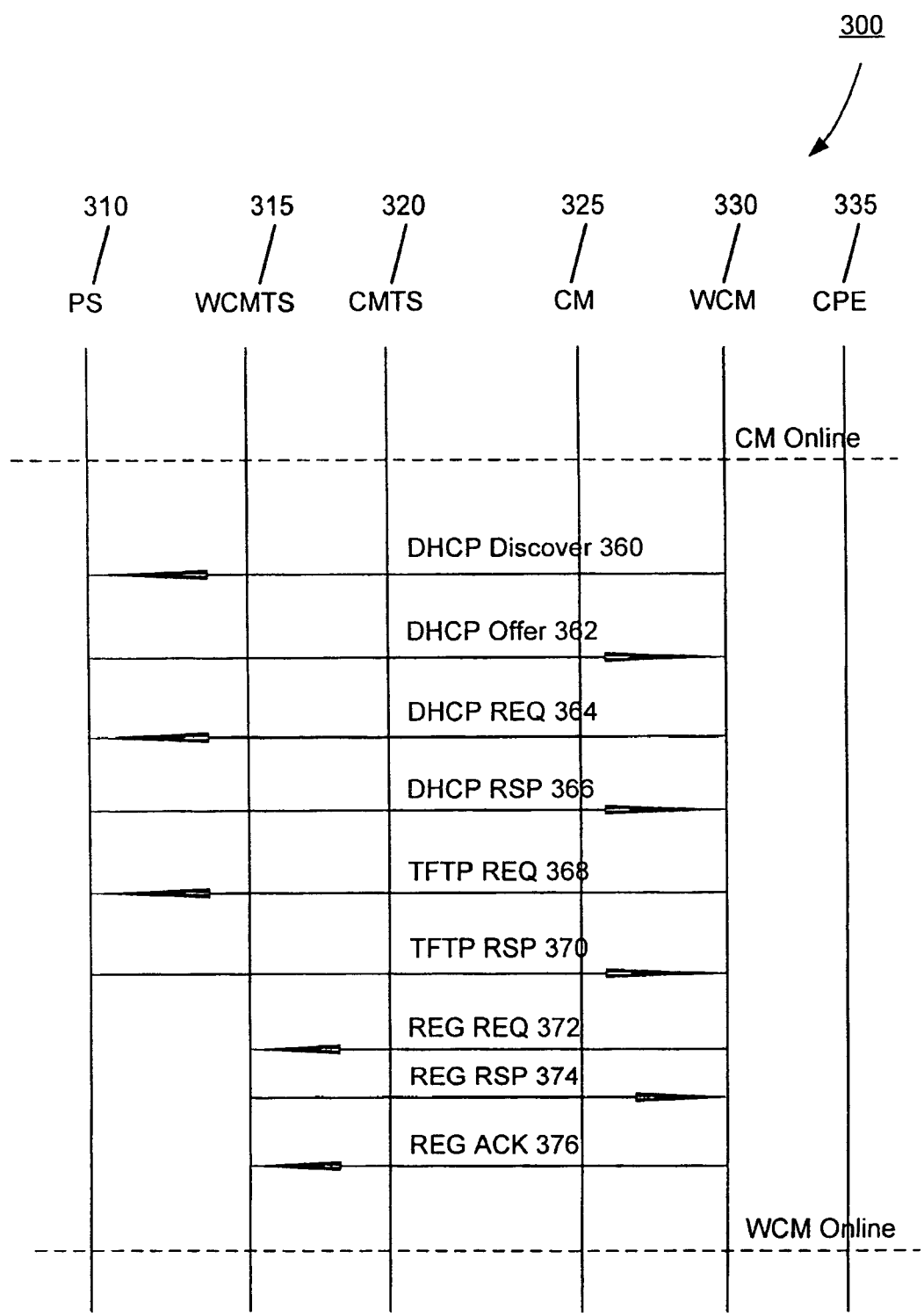
FIG. 3 illustrates a double registration for a cable modem.

FIG. 3 illustrates the second part of a double registration 300 for a cable modem. Double registration 300 shows the communications between a provisioning server 310, a WCMTS 315, a CMTS 320, a CM 325, a WCM 330 and a CPE 335. In FIG. 3, the WCMTS 315 and CMTS 320 are shown as separate, but may reside in the same or separate devices. Furthermore, CM 325 and WCM 330 are shown separately but may reside in the same devices. Generally, FIG. 3 represents cable modem registration by showing different functional components typically involved in registration as well as additional wideband components, but the components are not necessarily restricted to being separate as shown, and in fact, many of them may exist within the same device.

Double registration 300 shows a cable modem 325 already online 350. In the double registration 300 shown in FIG. 3, after the cable modem is online a DHCP exchange happens. In an embodiment, a WCM 330 may use the same IP address space as a standard CM, this allows the WCM 330 to use the same DHCP procedure to procure an IP address. The WCM 330 sends a DHCP discover 360 to the provisioning server 310. Provisioning server 310 sends a DHCP offer 362 to WCM 330 in response to the DHCP discover 360. WCM 330 then sends a DHCP request 364 to the provisioning server 310. The provisioning server 310 responds with a DHCP response 366 to the WCM 330.

In one embodiment, a WCM 330 identifies itself as being wideband capable during the configuration process. This allows a DOCSIS TFTP provisioning server to enable or disable wideband mode, and to choose the appropriate configuration parameters for the CM.

In the present embodiment, after the DHCP exchange happens, WCM 330 sends a TFTP request 368 to the provisioning server 310. The provisioning server 310 responds with a TFTP response 370. After the TFTP exchange between the WCM 330 and the provisioning server 310, the WCM 330 and the WCMTS 315 communicate directly. The WCM 330 sends a registration request 372 to WCMTS 315 comprising a configuration file. The WCMTS 315 responds with a registration response 374. After the registration response 374, WCM 330 sends a registration acknowledgment 376 and the WCM 330 is online 352. Referring back to cable network 100 in FIG. 1, the provisioning server 110, CMTS 130 and CM 140 will now be described in more detail.

Figure 4:
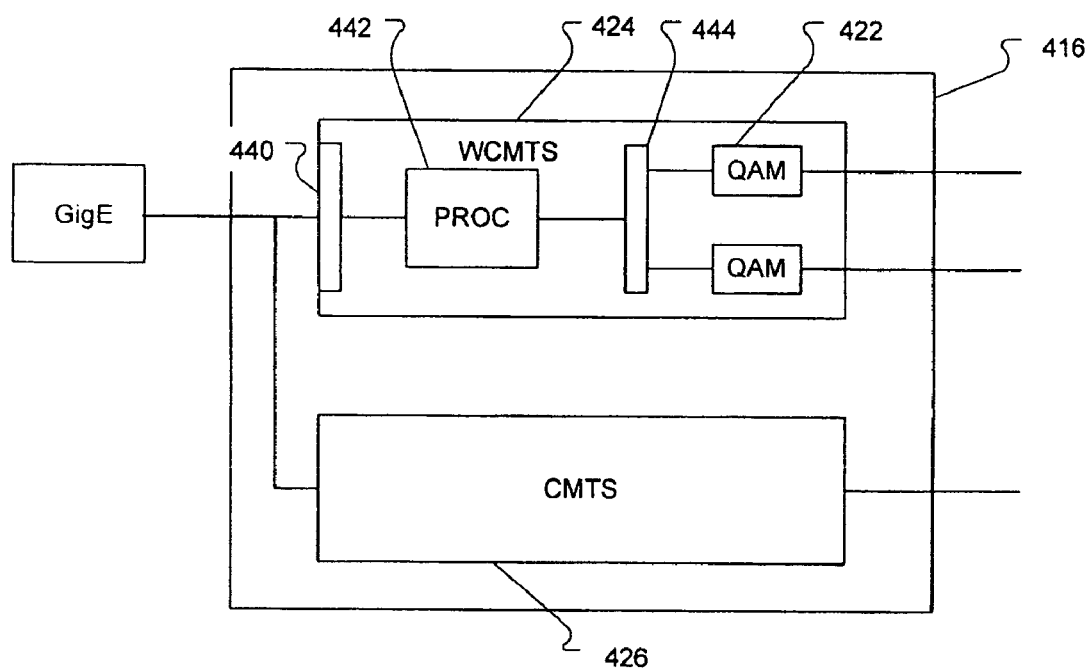
FIG. 4 illustrates an embodiment of a wideband cable modem termination server.

FIG. 4 illustrates an embodiment of a wideband cable modem termination server. In this particular embodiment, the QAMs 422 are shown as residing with the CMTS. As mentioned above, this may not be the case. Also, the WCMTS 416 may actually be comprised of a regular or narrowband CMTS 426 and a wideband CMTS 424. This is not a necessary configuration, as the two different types of CMTSs may be in separate devices, but may also provide some convenience in allowing both narrowband and wideband data to be handled by the same box.

Figure 5:
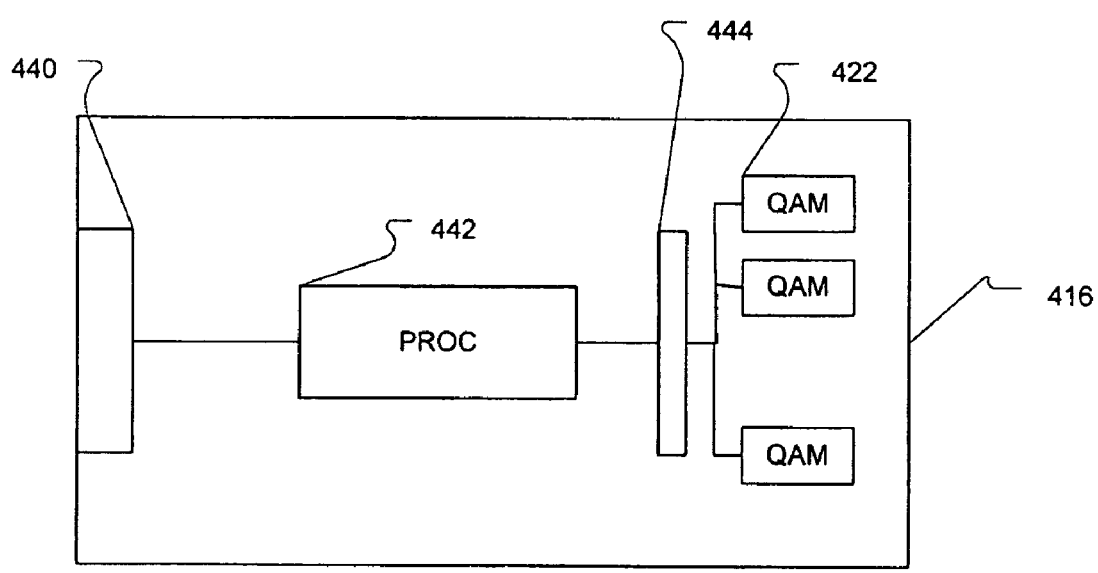
FIG. 5 illustrates an alternative embodiment of a wideband cable modem termination server.

The configuration shown as 416 in FIG. 4 is an embodiment of a wideband-narrowband CMTS. An embodiment of a configuration of a standalone wideband CMTS is shown in FIG. 5. The embodiment of FIG. 5 includes QAMs 422, but as mentioned above, this is one alternative embodiment. The wideband device will more than likely perform the same functions whether it is in a wideband-narrowband device or a standalone wideband CMTS, and will be discussed here with regard to FIG. 4.

The data is received from the GigE switch and sent to either the WCMTS or the CMTS depending upon the destination of the data. The WCTMS then receives the data through an interface 440 compatible with the GigE data. In order to differentiate between the incoming and outgoing interfaces, the incoming interface or communications port will be referred to as communicating with the data network.

A processor 442 receives the data from the data network, such as Ethernet frames. Ethernet frames refer to the data received in a format compatible with the Institute of Electrical and Electronic Engineers standard 802.3. The frames are then converted into DOCSIS packets and transmitted across the cable interface 444 to the QAMs 422. A wideband CMTS may use several narrowband channels to transmit data in the downstream. In one embodiment, a wideband channel is a collection of narrowband channels bonded together, and may be referred to as channel bonding.

Figure 6:
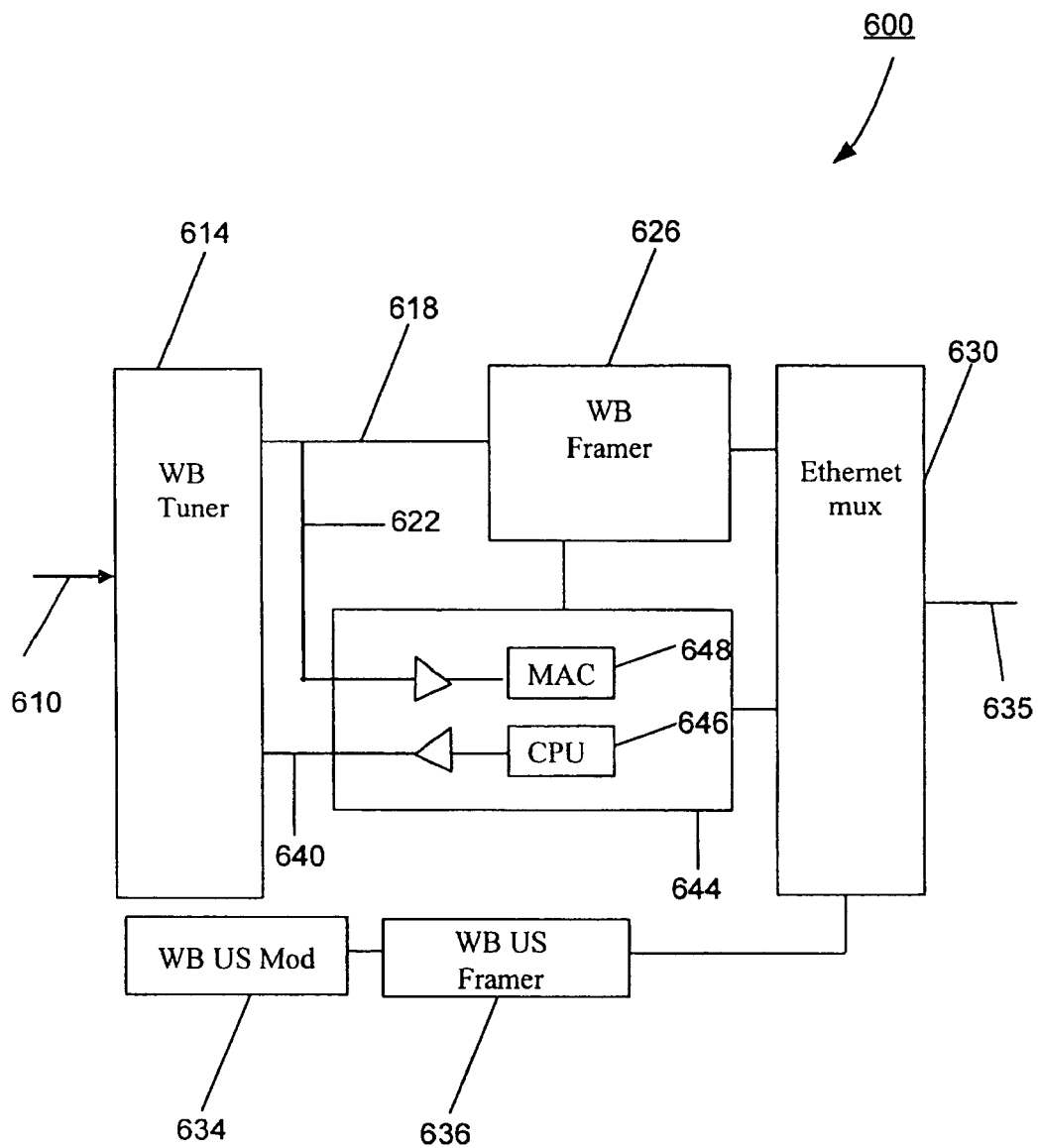
FIG. 6 illustrates an example wideband cable modem.

FIG. 6 illustrates an embodiment cable modem 600, in this case a cable modem with built in wideband functionality. The present embodiment may use hardware 644, such as a DOCSIS capable chip, that comprises a MAC 648 and a processing device, for example CPU 646. CPU 646 may be coupled with bus 640 to the wideband tuner 614. The MAC 648 may be coupled to bus 622 and therefore coupled with a tuner such as wideband tuner 614, and may receive conventional narrow band data over bus 622. In an embodiment bus 622 can branch from bus 618. In an embodiment bus 618 may comprise 16 channels. Bus 618 may be coupled to a wideband tuner 614 which may send and receive RF signals at 610. In the present embodiment, bus 618 couples wideband tuner 614 with a wideband framer 626. The wideband framer may then couple with an Ethernet multiplexer 630 which in turn may be connected to the DOCSIS capable chip 644. The Ethernet multiplexer 630 may also be coupled with a wideband upstream framer 636 which is coupled to a wideband upstream modulator.

Figure 11:
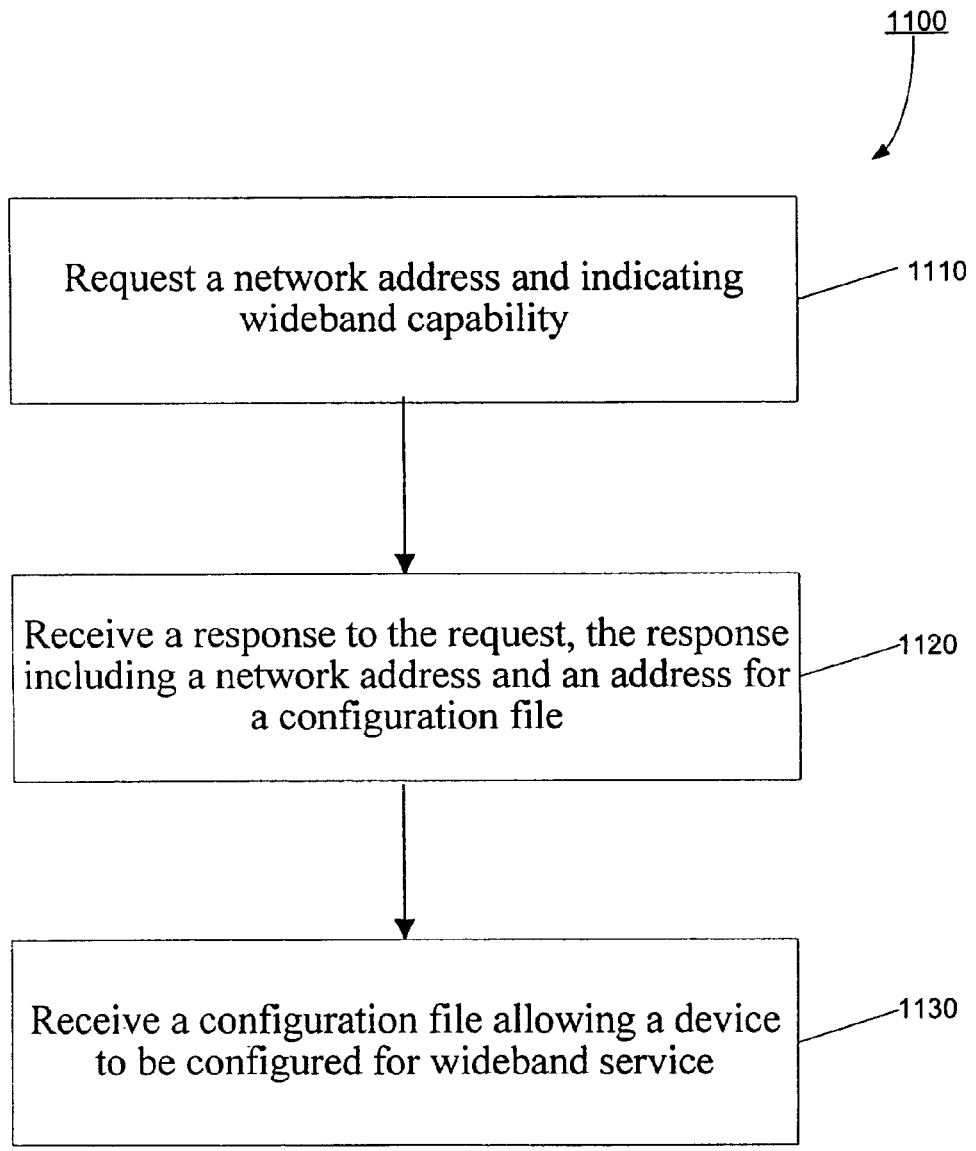
FIG. 11 illustrates a flow diagram showing a method for provisioning wideband cable.

FIG. 11 illustrates a flow diagram showing a method 1100 for provisioning wideband cable. An embodiment may comprise a method of requesting a network address and indicating wideband capability at block 1110, receiving a response to the request at block 1120, the response including a network address and an address for a configuration file, and receiving a configuration file that allowing a device to be configured for wideband service at block 1130.

In an embodiment, wideband capability is indicated by a dynamic host configuration protocol (DHCP) option 82. The DHCP relay agent information option (option 82) enables a Dynamic Host Configuration Protocol (DHCP) relay agent to include information about itself when forwarding client-originated DHCP packets to a DHCP server. The DHCP server can use this information to implement IP address or other parameter-assignment policies. In some embodiments, receiving a configuration file that allows wideband service further comprises using a trivial file transfer protocol (TFTP). In yet another embodiment, receiving a configuration file that allows wideband service further comprises receiving a configuration file with a time length value that enables wideband capability.

One embodiment may be a cable modem including a port to request a network address and indicate wideband capability, and a processor coupled with the port, the processor to receive a response to the request, the response to include a network address and an address for a configuration file, and receive a configuration file to allow the cable modem to be configured for wideband service. In an embodiment, the indication of wideband capability is indicated by a dynamic host configuration protocol (DHCP) relay agent information option 82. In some embodiments, the configuration file that allows wideband service is to be provided with a trivial file transfer protocol (TFTP). In yet another embodiment, the configuration file further comprises a time length value that enables wideband capability.

An embodiment may be a cable modem including means for requesting a network address and indicating wideband capability, means for receiving a response to the request, the response including a network address and an address for a configuration file, and means for receiving a configuration file that allowing the cable modem to be configured for wideband service. In an embodiment, the means for requesting further comprises means for detecting a dynamic host configuration protocol (DHCP) relay agent information option 82 allowing a cable modem to indicate to a provisioning server that it is capable of running in a wideband mode. In an embodiment, the means for receiving a configuration file further comprises means for using a trivial file transfer protocol (TFTP). In yet another embodiment, the means for receiving a configuration file further comprises means for using a configuration file with a time length value that enables wideband capability.

Figure 7:
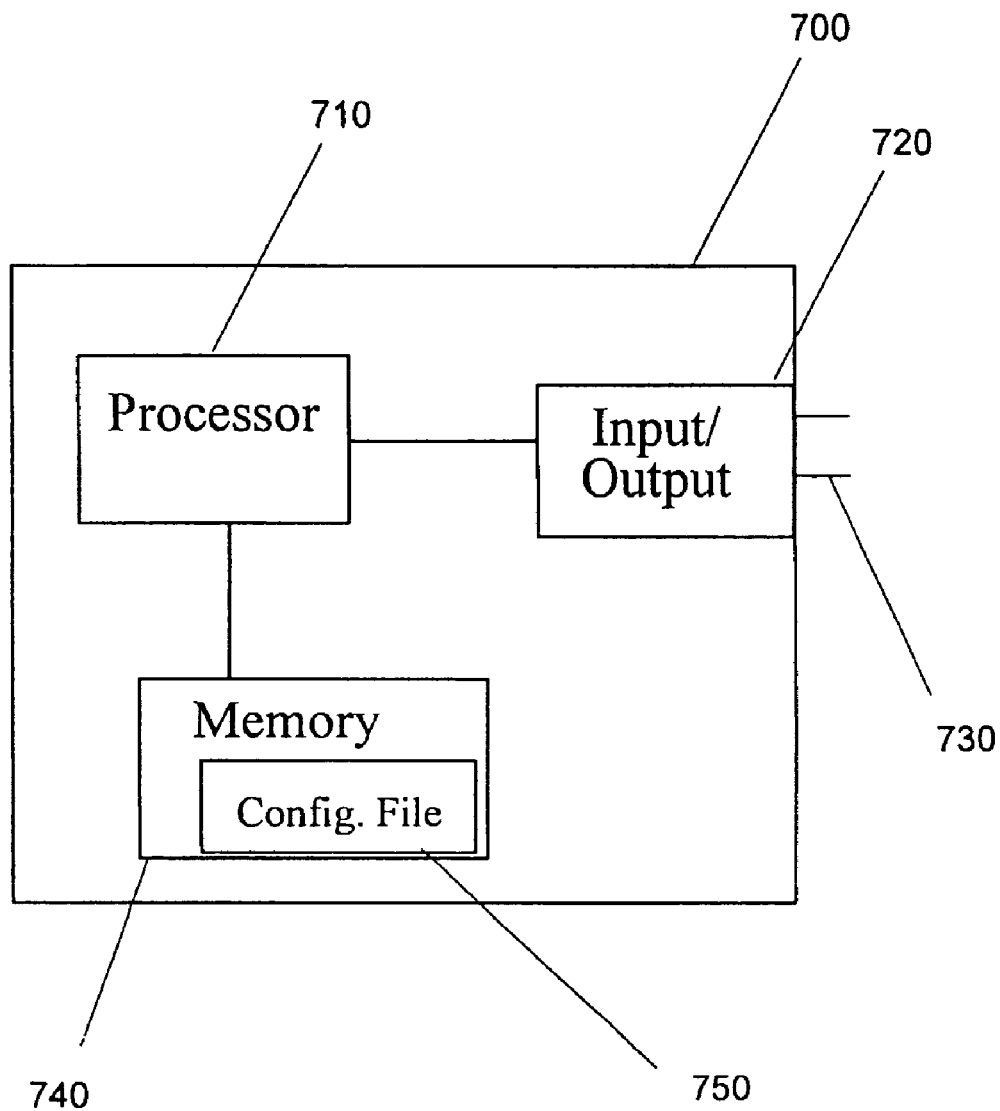
FIG. 7 illustrates a provisioning server according to an embodiment of the present invention.

FIG. 7 illustrates a provisioning server 700 according to an embodiment of the present invention. Provisioning server 700 includes a processor 710, a memory 740 and an input and output (I/O) 720 coupled to a port 730. Memory 740 may store at least one configuration file 750, such as the example configuration file above, that the processor 710 may access and allow the server to provision cable modem services.

Figure 12:
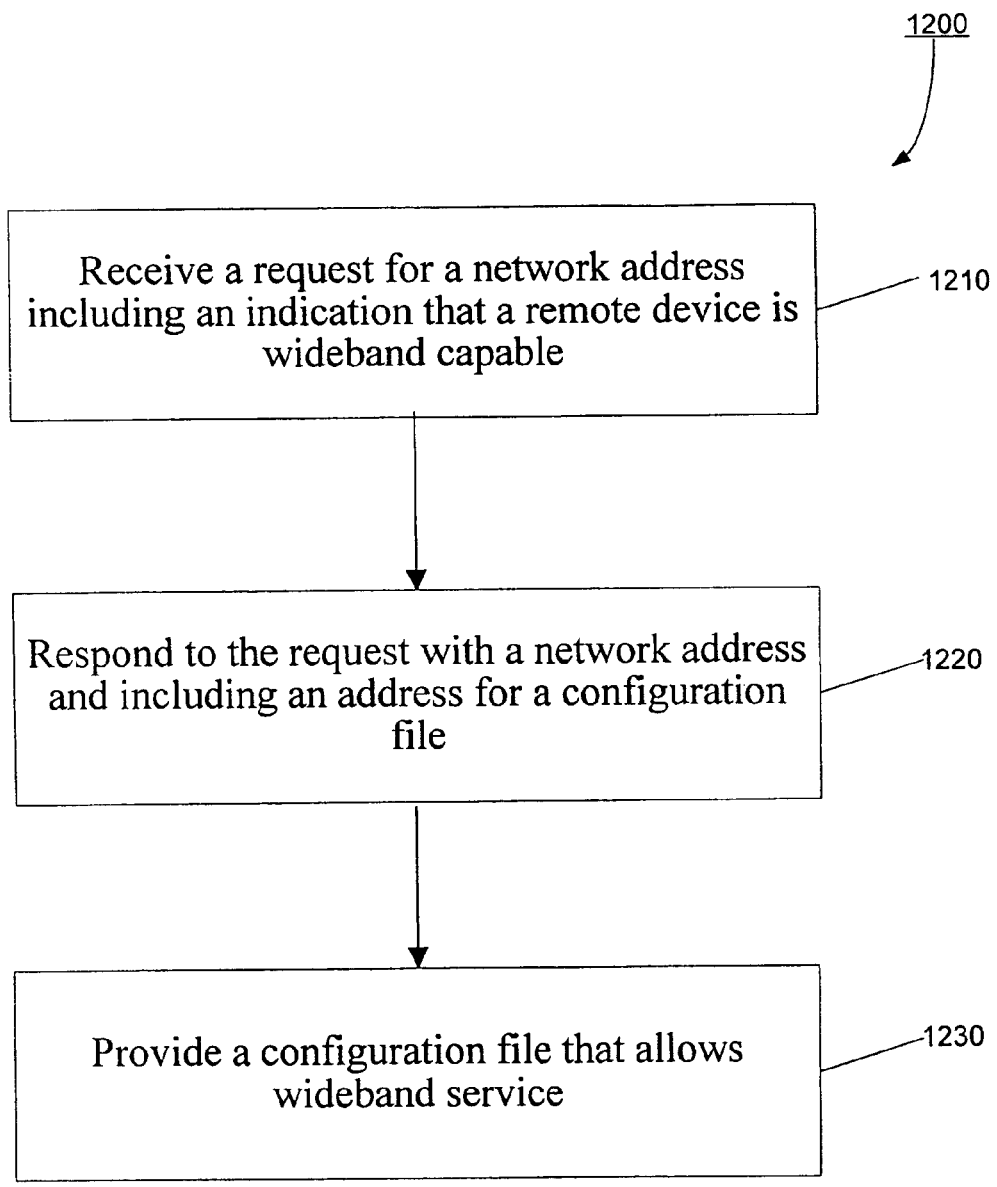
FIG. 12 illustrates a flow diagram showing a method for provisioning wideband cable.

FIG. 12 illustrates a flow diagram showing a method 1200 for provisioning wideband cable. One embodiment may comprise a method of provisioning wideband cable service including receiving a request for a network address including an indication that a remote device is wideband capable at block 1210, responding to the request with a network address and including an address for a configuration file at block 1220, and providing a configuration file that allows wideband service at block 1230.

The present embodiment may further include an indication that a remote device is wideband capable by indicating with a dynamic host configuration protocol (DHCP) relay agent information option 82 thus allowing a cable modem to indicate to a provisioning server that it is capable of running in a wideband mode. An embodiment may provide a configuration file that allows wideband service further comprises using a trivial file transfer protocol (TFTP). An embodiment may provide a configuration file that allows wideband service further comprises a configuration file with a time length value that enables wideband capability.

An embodiment may comprise a provisioning server that includes a port to receive a request for a network address including an indication that a remote device is wideband capable. The present provisioning server also includes a processor to respond to a request with a network address and include an address for a configuration file and to provide a configuration file that allows wideband service. An embodiment may indicate wideband capability with a dynamic host configuration protocol (DHCP) relay agent information option. In an embodiment, the configuration file that allows wideband service may be provided with a trivial file transfer protocol (TFTP). In an embodiment, the configuration file further comprises a time length value that enables wideband capability.

An embodiment may comprise a provisioning server including means for receiving a request for a network address including an indication that a remote device is wideband capable, means for responding to the request with a network address and including an address for a configuration file, and means for providing a configuration file that allows wideband service. In some embodiments, the means for receiving a request further comprises means for detecting a dynamic host configuration protocol (DHCP) relay agent information option allowing a cable modem to indicate to a provisioning server that it is capable of running in a wideband mode. In an embodiment, the means for providing a configuration file further comprising means for using a trivial file transfer protocol (TFTP). In yet another embodiment, the means for providing a configuration file further comprising means for using a configuration file with a time length value that enables wideband capability.

Figure 13:
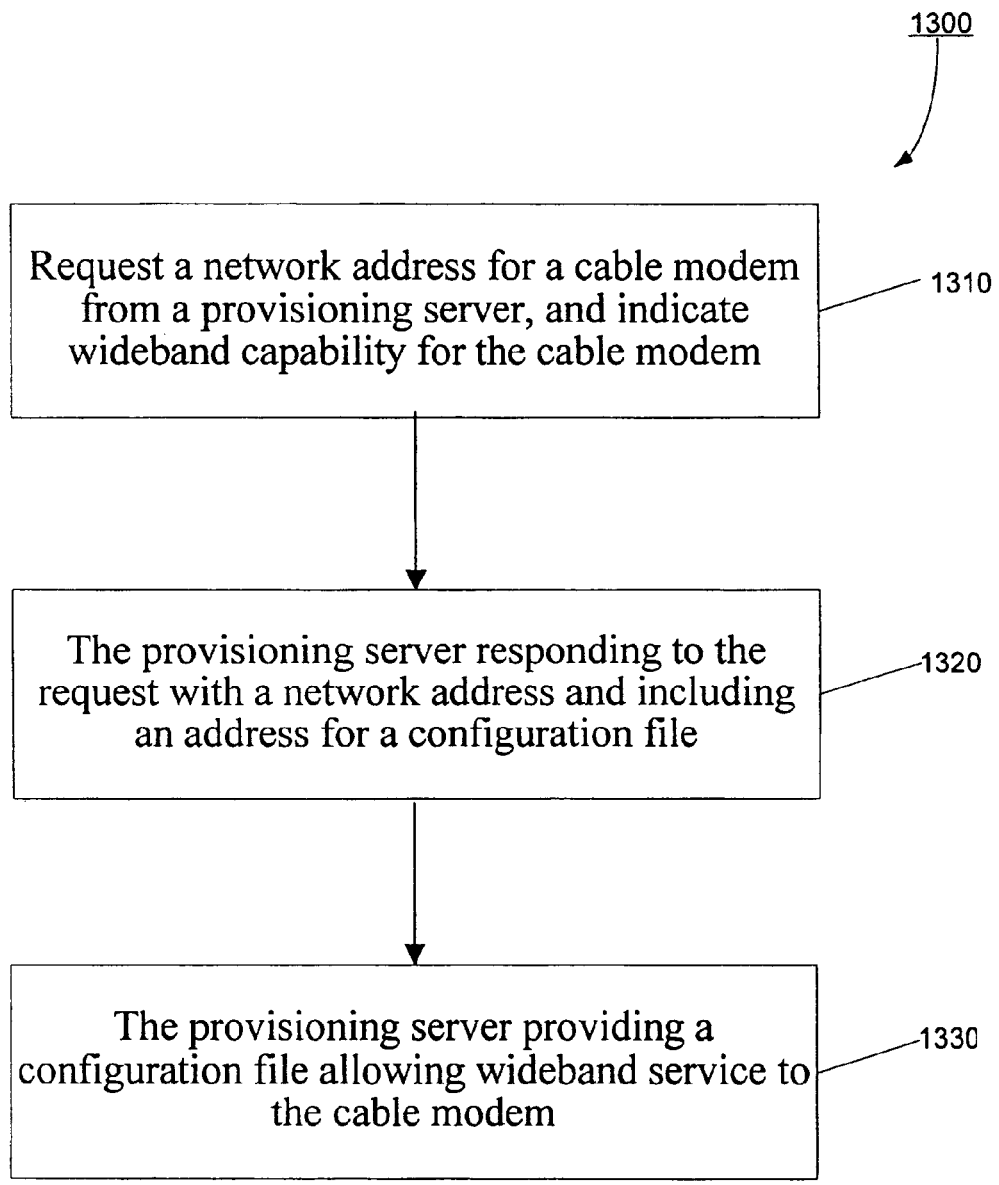
FIG. 13 illustrates a flow diagram showing a method for provisioning wideband cable.

FIG. 13 illustrates a flow diagram showing a method 1300 for provisioning wideband cable. An embodiment may comprise a method 1300 of provisioning wideband service in a cable network including requesting a network address for a cable modem from a provisioning server in block 1310, and indicating wideband capability for the cable modem, the provisioning server responding to the request with a network address and including an address for a configuration file at block 1320, and the provisioning server providing a configuration file allowing wideband service to the cable modem at block 1330.

In an embodiment, the wideband capability is indicated by a dynamic host configuration protocol (DHCP) relay agent information option. In an embodiment, providing a configuration file that allows wideband service further comprises using a trivial file transfer protocol (TFTP). In yet another embodiment, providing a configuration file that allows wideband service further comprises providing a configuration file with a time length value that enables wideband capability.

Referring back to the embodiment illustrated in FIG. 2, as a cable modem begins registration, the cable modem may apply the relevant values already received from an initial TFTP exchange. This presents an interesting issue regarding how to define a TFTP file in such a way that it will apply to multiple upstreams even though only a single DHCP process happened. This is accomplished with type-length-value (TLV), which is an encoding method consisting of three fields, a first field indicating the type of an element, a second field indicating the length of an element, and a third field that contains an element's value. In an embodiment the provisioning server may be made aware the cable modem is wideband capable in the DHCP process. For example, a sub-option of a DHCP relay agent information option may allow the CM to indicate to the provisioning server that the CM is capable of running in a WB mode. In this embodiment, the provisioning server may then choose a WB configuration for that CM instead of a NB configuration.

A service flow or any type of information may be defined with a TLV. TLVs are stored in a configuration file. In an embodiment, all upstreams for a cable modem may be defined in a single configuration file. Furthermore, TLVs may be nested. For example, an embodiment may define 5 service flows. This embodiment may use 5 TLVs that define service flows and within each one of these 5 TLVs it may encapsulate sub-TLVs. An example sub-TLV that may be encapsulated in one of the 5 example TLVs may state a peak rate of 1 megabit for the related service flow. In this embodiment, a TLV may name service flows 1, 2, 3, 4, etc., and a sub-TLV may define the specific parameters for each service flow.

Additionally, a super TLV such as an upstream identifier, or SID identifier, etc., may be used to distinguish flows as not only a flow that belongs to a specific modem but a flow that belongs to a specific modem and a specific upstream. Higher orders of TLVs allow global identifiers to classify multiple service flows, this allows each individual service flow to have its normal definition. For example, an embodiment may have an upper level TLV service flow associated with multiple service flows, therefore it can stripe information across five upstreams and instead of having five TFTP files with five configurations, it can have one TFTP file and be logically separated into five pieces by adding an upper dimension or upper level TLV.

Lower level TLVs, on the other hand, allow differentiable control, for example to allow one stream to operate under conventional DOCSIS. This allows an embodiment high availability, for example if one upstream fails, an embodiment may stripe whatever it can over upstreams that are still available.

An example configuration file with multiple TLVs designating upstream encodings, downstream encodings, privacy rights, access control, a maximum number of CPE's, packet classifications, etc., may use the following format:

```
03 (Net Access Control)         = 1
18 (Maximum Number of CPE)      = 4
22 (Upstream Packet Classification Encoding Block)
    S01 (Classifier Reference)          = 1
    S03 (Service Flow Reference)        = 3
    S05 (Rule Priority)                 = 0
    S06 (Classifier Activation State)   = 1
    S09 (IP Packet Encodings)
    S05 (IP Destination Address)    = 011 001 002 001
    S06 (IP destination mask)       = 255 255 255 000
22 (Upstream Packet Classification Encoding Block)
    S01 (Classifier Reference)          = 1
    S03 (Service Flow Reference)        = 3 ← the aggregate flow service
reference
    S05 (Rule Priority)                 = 0
    S06 (Classifier Activation State)   = 1
    S09 (IP Packet Encodings)
    S06 (IP destination mask)       = 255 255 255 000
    S05 (IP destination address)    = 002 002 002 002
24 (Upstream Service Flow Encodings) ← First SID for bonded group
    S01 (Service Flow Reference)        = 1
    S06 (QoS Parameter Set Type)        = 7
    S07 (Traffic Priority)              = 0
    S08 (Max Sustained Traffic Rate)    = 20000000
    S09 (Max Traffic Burst)             = 1522
    S10 (Min Reserved Traffic Rate)     = 0
    S12 (Timeout Active QoS Parms)      = 0
    S13 (Timeout Admitted QoS Parms)    = 0
    S15 (Service Flow Sched Type)       = 2
    S14 (Maximum Concatenated Burst)    = 1522
24 (Upstream Service Flow Encodings) ← Second SID for bonded group
    S01 (Service Flow Reference)        = 2
    S06 (QoS Parameter Set Type)        = 7
    S08 (Max Sustained Traffic Rate)    = 0
    S09 (Max Traffic Burst)             = 1522
    S10 (Min Reserved Traffic Rate)     = 10000000
    S12 (Timeout Active QoS Parms)      = 0
    S13 (Timeout Admitted QoS Parms)    = 0
    S15 (Service Flow Sched Type)       = 2
    S16 (Request/Transmission Policy)   = 00 00 00 e0
24 (Upstream Service Flow Encodings) ← The aggregate flow
    S01 (Service Flow Reference)        = 3
    S06 (QoS Parameter Set Type)        = 7
    S08 (Max Sustained Traffic Rate)    = 20000000
    S09 (Max Traffic Burst)             = 1522
    S12 (Timeout Active QoS Parms)      = 0
    S13 (Timeout Admitted QoS Parms)    = 0
    S15 (Service Flow Sched Type)       = 2
YY (Flow list mapping)
    S01 (service flow channel list)     = 01 02
    S02 (aggregated flow)               = 03
25 (Downstream Service Flow Encodings)
    S01 (Service Flow Reference)        = 3
    S06 (QoS Parameter Set Type)        = 7
    S07 (Traffic Priority)              = 0
    S08 (Max Sustained Traffic Rate)    = 10000000
    S09 (Max Traffic Burst)             = 1522
    S10 (Min Reserved Traffic Rate)     = 0
    S12 (Timeout Active QoS Parms)      = 0
    S13 (Timeout Admitted QoS Parms)    = 0
29 (Privacy Enable)             = 1
```

Referring to this example configuration file, the segment at 24 (Upstream Service Flow Encodings), S01 (Service Flow Reference)=3, may be considered a super TLV that encapsulates an aggregate flow. In an embodiment the TLV at 24 (Upstream Service Flow Encodings), S01 (Service Flow Reference)=3, may be classified in an upstream channel configuration group.

In the present example, the 24 (Upstream Service Flow Encodings) with S01 (Service Flow Reference)=3, may correspond to defining a service flow, and sub-TLVs may be options of a service flow. For example, sub-TLV S08 may be a maximum sustained traffic rate and S09 may be a burst size, etc.

Referring to the configuration file, 24 (Upstream Service Flow Encodings) with S01 (Service Flow Reference)=1 may refer to a SID 1, and 24 (Upstream Service Flow Encodings) with SO1 (Service Flow Reference)=2 may refer to a SID 2. In this example, Service Flow Reference=1 has a peak rate of 20,000,000 (for example, 20 megabits per second), Service Flow Reference=2 has a peak rate of 10,000,000. These values represent individually thresholds for each flow. In the example configuration file, both of these flows are mapped into the aggregate flow, Service Flow Reference=3, which is limited again to 20,000,000. This illustrates a way to manage separate and aggregated data streams. An embodiment may therefore allocate bandwidth to a wideband channel. The registration processes illustrated in FIG. 2 and FIG. 3 allow a CM to fetch a correct CM configuration file from a provisioning server. The provisioning server, on the other hand, may provision CM service by using the TLVs found in the configuration file.

In one embodiment, a WCM may register using a conventional narrowband (NB) channel, and may subsequently add any number of other channels to its upstream channel list using a wideband (WB) configuration file. In this embodiment, each one of the individual upstreams goes through a standard process of scanning UCDs, selecting one, and then waiting for a MAP with an initial maintained slot. In this embodiment, each upstream may run its own keep alive process. In an embodiment, all UCDs and MAPs are sent on the downstream NB channel the modem registered on, however, in other embodiments a tunneled UCD/MAPs may be sent over a wideband downstream channel.

Various arrangements exist for configuration files to be used in provisioning of wideband service. For example, in one embodiment, one configuration file may be used and sent from a provisioning server to a CM and from the CM to a CMTS. In another embodiment, one configuration file may be sent from a provisioning server to a CM, but then two configuration files may be sent from a CM to a CMTS, in this embodiment, one of these configuration files is for NB and one is for WB. Another exemplary embodiment may use two configuration files, one for NB and one for WB.

In an embodiment, all upstream in a WB upstream group may acquire an upstream in parallel. In other embodiments, upstreams may be acquired individually. In some embodiments, for each channel under a wideband channel group TLV, a CM may start a UCD search on either a WB or a NB downstream. In this embodiment the CM will generally select an upstream that is not already in use, but may be provisioned otherwise, for example by an upstream channel ID TLV.

Example TLVs for a wideband configuration file include an Aggregate QoS Mapping TLV, a Flow List TLV, an Aggregated Flow TLV and an Upstream Channel Configuration Group TLV, as shown in FIG. 8.

Referring to FIG. 8, example upstream TLVs for a wideband configuration file are illustrated. The Aggregate QoS Mapping TLV is to map a set of flows onto a single service flow, for example to create a striped upstream configuration or to provide a hierarchical queueing policy. The Flow List TLV may be used to specify the list of a service flow references for all flows that are aggregated together. In an embodiment, SFREF availability may need to be checked when using this TLV. The Aggregated Flow TLV may be used to specify the flow reference of the flow that aggregates all the traffic form the flow list in a Flow List TLV. Lastly, the Upstream Channel Configuration Group TLV may be used to group several definitions for different upstreams into one TFTP file, for example by grouping the individual upstream definitions as sub-TLVs. Other example TLVs may include a TLV for tunneling information, or a TLV for a default service flow, as examples.

FIG. 9 illustrates additional MAC management message types that may be used in wideband provisioning. FIG. 9 includes an example wideband downstream channel descriptor (WDCD) and an example wideband upstream channel descriptor (WUCD), with associated type values, versions and message names. In an embodiment, these channel descriptors are periodically transmitted by a wideband capable CMTS to define the characteristics of a logical wideband downstream channel and the characteristics of a wideband upstream channel. In an embodiment, separate messages are transmitted for each wideband upstream channel that is currently available for use.

The WDCD may comprise a configuration change count that can be incremented by a CMTS whenever any of the values of the present channel descriptor change. In an embodiment, a CM can subsequent WDCDs with the same values and can determine channel operating parameters have not changed and may further be able to disregard the remainder of a message. An example WDCD may also include a bonded downstream channel ID. In an embodiment this ID may be a 16-bit identifier of a bonded downstream channel to which the present message refers. In an embodiment this identifier is arbitrarily chosen by a CMTS and may be unique only within the CMTS chassis. Other variables for a WDCD may be encoded as TLV parameters.

The WUCD may comprise a configuration change count that can be incremented by a CMTS whenever any of the values of the present channel descriptor change. In an embodiment, a CM can subsequent WUCDs with the same values and can determine channel operating parameters have not changed and may further be able to disregard the remainder of a message. An example WUCD may also include wideband upstream channel ID. In an embodiment this may identify the wideband upstream channel a message refers to. In an embodiment this identifier is arbitrarily chosen by a CMTS and may be unique only within a MAC-sublayer domain. Other variables for a WUCD may be encoded as TLV parameters.

For registration of a bonded channel, a CM may require additional steps over conventional registration methods. In an embodiment, after a WCM successfully locks on a non-bonded downstream, it may start collecting and selecting WDCDs and WUCDs. In this embodiment the WCM should define its WB capability during its DHCP discovery sequence. In an embodiment, before the WCM sends out a REG-REQ such as in FIG. 3 above, it may validate the WB downstream and upstream channels. In this embodiment the WCM should include the WB downstream channel ID and WB upstream channel ID in the REG-REQ.

In an embodiment, a bonded upstream service flow may consist of one or more non-bonded upstream service flows. A non-bonded upstream service flow ID may be associated with only one bonded upstream service flow. In one embodiment WCM registration, the association of non-bonded upstream service flows to bonded upstream service flows may be created in the configuration file and sent in a REG-REQ with reference SFIDs/SIDs. In the present embodiment, another option is to have only the bonded upstream service flow specified in the REG-REQ and allow a CMTS to fill in its own choice of SFIDs/SIDs in the REG-RSP.

In one embodiment, a WCM initiated dynamic service addition (DSA) or dynamic service change (DSC), may have an association of non-bonded upstream service flows to bonded upstream service flows that may be created and sent in a DSA/DSC-REQ with reference SFIDs/SIDs. An alternative embodiment provides the bonded upstream service flow can be specified in the DSA/DSC-REQ and the CMTS will fill in its own choice of SFIDs/SIDs in the DSA/DSC-RSP. In another embodiment, for a WCMTS initiated DSA/DSC, the association of non-bonded upstream service flows to bonded upstream service flows may be created and sent in a DSA/DSC-REQ with their SFIDs/SIDs.

In some embodiments, registration may assign service flow IDs (SFIDs) to a CM to match its provisioning. In this embodiment, the CM may use a temporary service ID to complete a number of protocol transactions prior to completion of registration. In the present embodiment, when the CMTS allocates a temporary SID for a CM that has at least one already, it may assign a QoS that prevents transmission of data packets since a CM uses its initial SID for initialization (DHCP, TFTP, etc). On reception of an initial ranging request, the CMTS may allocate a temporary SID and assign it to the CM for initialization use. When assigning provisioned SFIDs on receiving a registration request, the CMTS may re-use the temporary SID, assigning it to one of the service flows requested.

FIG. 10 illustrates example TLVs for configuration of a downstream. The example TLVs include, a Bonded Downstream Channel ID Configuration Setting TLV, an Enable Wideband Mode Configuration TLV, an RF Channel Frequency TLV, an RF Channel Modulation Type TLV, an RF Channel PID TLV, and an RF Channel Annex Type TLV. These TLVs are example TLVs for a configuration file for wideband provisioning of cable service. Additional functionality may be added in other TLVs.

The Bonded Downstream Channel ID Configuration Setting TLV may include the bonded downstream channel a CM uses. In an embodiment, the CM may monitor a defined non-bonded downstream channel until a WDCD message with this ID is found.

In an embodiment this may function as an override for a bonded downstream channel selected during initialization.

The Enable Wideband Mode Configuration TLV may define if a CM is allowed to access a bonded downstream channel. In some embodiments this TLV may be determined by CM capability and provisioning, network topology and by availability of a bonded downstream channel, as examples.

The RF Channel Frequency TLV may specify the frequency of an RF channel that may make up a WB downstream channel that this WDCD refers to. In an embodiment, this is the center frequency of the downstream channel in Hertz and may be stored in a 32-bit binary number.

The RF Channel Modulation Type TLV in FIG. 10 may specify a channel modulation type of one of the RF channels that make up the WB downstream channel that this current WDCD refers. Example values would be 64 QAM or 256 QAM, and may be represented by a 0 and a 1 respectively.

The RF Channel PID TLV may be used to specify a PID value of MPEG packets of a downstream channel being transmitted on the current RF. The MPEG (Moving Pictures Experts Group) standard calls for the data to be transmitted in transport streams (TS), each identified by a unique program identifier (PID).

The final example TLV in FIG. 10 is the RF Channel Annex Type TLV which may specify a channel annex type of an RF channel.

The present invention may be embodied in other specific forms without departing from its spirit or essential characteristics. The described embodiments are to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are to be embraced as being within the scope of the appended claims.

The invention claimed is:

1. A method, comprising:

receiving, at a Cable Modem Termination System (CMTS), a request to assign an Internet Protocol (IP) address for a requesting device;

inserting an IP address for the CMTS into the request and relaying the request with the inserted IP address to a provisioning server;

receiving back a response from the provisioning server, wherein the response includes an assigned IP address of an address range associated with the inserted IP address of the CMTS, wherein the response includes a download address corresponding to the provisioning server for the requesting device to obtain a first Data Over Cable Service Interface Specification (DOCSIS) configuration file by download from the provisioning server;

storing the assigned IP address in a configuration table entry of the CMTS and relaying the response to the requesting device;

after relaying the response, receiving from the requesting device the first DOCSIS configuration file; and after relaying the response, receiving from the requesting device a second different DOCSIS configuration file;

wherein the requesting device registers twice with the CMTS with each of the registrations sending a different one of said DOCSIS configuration files to the CMTS, wherein the requesting device includes narrowband circuitry and wideband circuitry, and wherein the narrowband circuitry registers with the CMTS according to the first DOCSIS configuration file and the wideband circuitry registers with the CMTS according to the second DOCSIS configuration file.

2. The method of claim 1, further comprising storing information from the second DOCSIS configuration file in the configuration table entry for the requesting device.

3. The method of claim 1, further comprising storing the second DOCSIS configuration file and associating the stored second DOCSIS configuration file with the requesting device.

4. The method of claim 1, wherein the request and the response comprise a Dynamic Host Configuration Protocol (DHCP) exchange between the provisioning server and the requesting device, and wherein the CMTS snoops the assigned IP address value from the DHCP exchange between the provisioning server and the requesting device.

5. The method of claim 1, wherein the request and the response comprise a DHCP exchange between the provisioning server and the requesting device, and wherein the CMTS at least partially controls a range of IP address values to be used by the provisioning server when selecting the IP address for the requesting device by inserting the IP address of the CMTS.

6. The method of claim 1, wherein the requesting device downloads the first DOCSIS configuration file from the provisioning server using information included in the response.

7. The method of claim 1, wherein the provisioning server processes relayed address requests from a plurality of CMTS's including both wideband CMTS's and narrowband CMTS's.

8. The method of claim 7, wherein the provisioning server provides a central location for cable modems to download DOCSIS configuration files and each of the CMTS's stores DOCSIS configuration files sent by their respective cable modems after downloading from the provisioning server.

9. A Cable Modem Termination System (CMTS) encoded with instructions that, if executed, result in:

receiving a request to assign an Internet Protocol (IP) address;

inserting an IP address for the CMTS into the request and relaying the request with the inserted IP address to a provisioning server, wherein the request includes a download address corresponding to the provisioning server for a requesting device to obtain a first Data Over Cable Service Interface Specification (DOCSIS) configuration file by download from the provisioning server;

receiving back a response from the provisioning server, wherein the response includes an assigned IP address of an address range associated with the inserted IP address of the CMTS;

storing the assigned IP address in a configuration table entry for the requesting device and relaying the response to the requesting device;

obtaining the first DOCSIS configuration file at the CMTS by snooping download of the first DOCSIS configuration file by the requesting device or by obtaining the first DOCSIS configuration file directly from the requesting device; and after relaying the response, receiving a communication from the requesting device and obtaining, based at least in part on information from the communication, a second different DOCSIS configuration file;

wherein the requesting device registers twice with the CMTS with each of the registrations associated with a different one of said DOCSIS configuration files, wherein the requesting device includes narrowband circuitry and wideband circuitry, and wherein the narrowband circuitry registers with the CMTS according to the first DOCSIS configuration file and the wideband circuitry registers with the CMTS according to the second DOCSIS configuration file.

10. The CMTS of claim 9, wherein the instructions, if executed, result in storing information extracted from the second DOCSIS configuration file in the configuration table entry for the requesting device.

11. The CMTS of claim 9, wherein the instructions, if executed, result in storing the second DOCSIS configuration file and associating the stored second DOCSIS configuration file with the requesting device.

12. The CMTS of claim 9, wherein the request and the response comprise a Dynamic Host Configuration Protocol (DHCP) exchange between the provisioning server and the requesting device, and wherein the CMTS snoops the assigned IP address value from the DHCP exchange between the provisioning server and the requesting device.

13. The CMTS of claim 9, wherein the request and the response comprise a DHCP exchange between the provisioning server and the requesting device, and wherein the CMTS controls a range of IP address values to be used by the provisioning server when selecting the IP address for the requesting device by inserting the IP address of the CMTS.

14. An apparatus encoded with instructions that, if executed, result in:

broadcasting a request for an Internet Protocol (IP) address and receiving back, from a Cable Modem Termination System (CMTS), a response including the IP address assigned by a provisioning server;

wherein the response includes a download address corresponding to the provisioning server;

downloading a first Data Over Cable Service Interface Specification (DOCSIS) configuration file from the provisioning server using the download address; and sending, to the CMTS, the first downloaded DOCSIS configuration file and a second different DOCSIS configuration file;

wherein the apparatus includes narrowband circuitry and wideband circuitry, and wherein the apparatus registers twice with the CMTS with the narrowband circuitry registering with the CMTS according to the first DOCSIS configuration file and the wideband circuitry registering with the CMTS according to the second DOCSIS configuration file.

15. The apparatus of claim 14, wherein the response is relayed from the CMTS and the IP address contained in the response has a value corresponding to an IP address subnet of the CMTS.

16. The apparatus of claim 14, wherein the request is a broadcast Dynamic Host Configuration Protocol (DHCP) discover and the response is a DHCP response originating from the provisioning server.

17. The apparatus of claim 16, wherein the instructions, if executed, further result in:

inspecting the DHCP response to locate the download address inserted therein by the provisioning server; and downloading the first DOCSIS configuration file directly from the provisioning server using the Trivial File Transfer Protocol (TFTP).

18. A system, comprising:

a device configured to:

broadcast a request for an Internet Protocol (IP) address and receive back a response including the IP address assigned by a provisioning server;

wherein the response includes a download address corresponding to the provisioning server;

download a first Data Over Cable Service Interface Specification (DOCSIS) configuration file from the provisioning server using the download address contained in the response;

generate a second different DOCSIS configuration file based on the downloaded first DOCSIS configuration file; and send to a Cable Modem Termination System (CMTS) information from the second different DOCSIS configuration file including at least one setting in the second DOCSIS configuration file different from a setting in the first DOCSIS configuration file;

wherein the device registers twice with the CMTS with each of the registrations associated with a different one of said DOCSIS configuration files, wherein the device includes narrowband circuitry and wideband circuitry, and wherein the narrowband circuitry registers with the CMTS according to the first DOCSIS configuration file and the wideband circuitry registers with the CMTS according to the second DOCSIS configuration file.

19. The system of claim 18, wherein the CMTS is configured to:

receive the request and insert therein an IP address for the CMTS before relaying the request to the provisioning server; and snoop the assigned IP address from the response while relaying the response to the device, wherein the assigned IP address belongs to a same IP subnet as the IP address for the CMTS.

20. The system of claim 19, wherein the CMTS is configured to:

extract from a message relayed to the device the first DOCSIS configuration file; and analyze the information sent from the device and the first DOCSIS configuration file and generate the second DOCSIS configuration file according to the analysis.

* * * * *